United States Patent Office 3,558,391
Patented Jan. 26, 1971

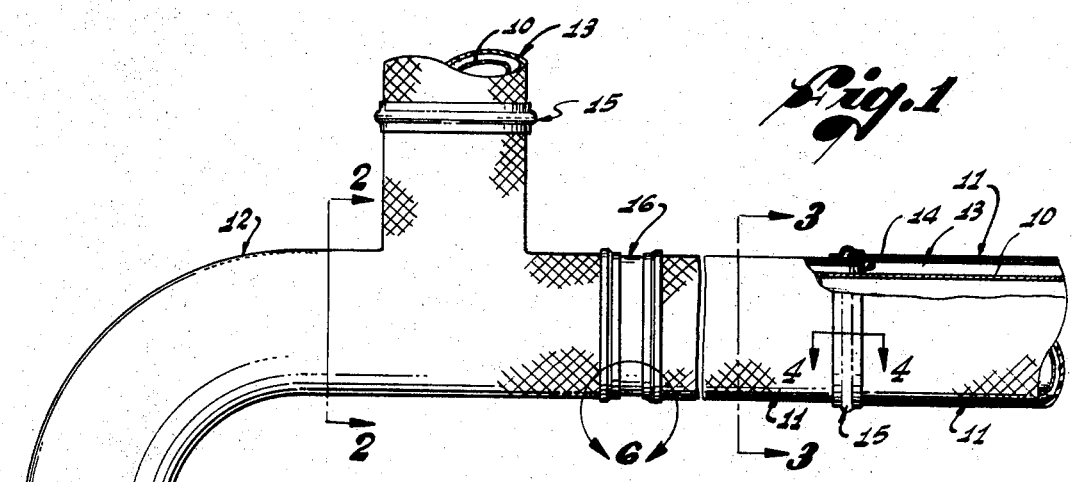
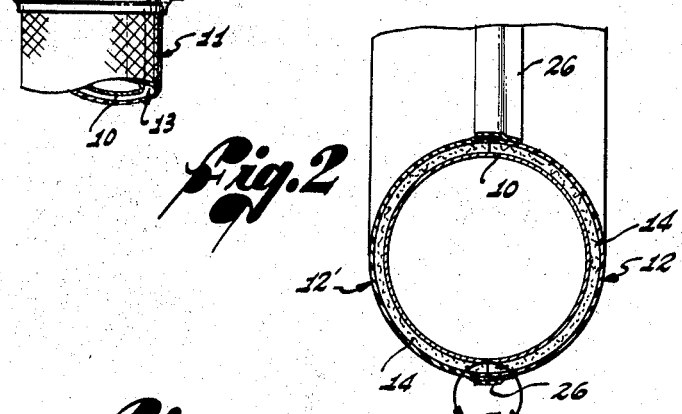
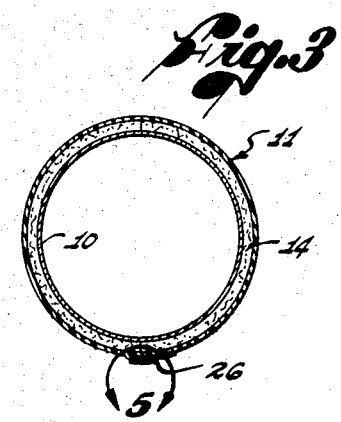
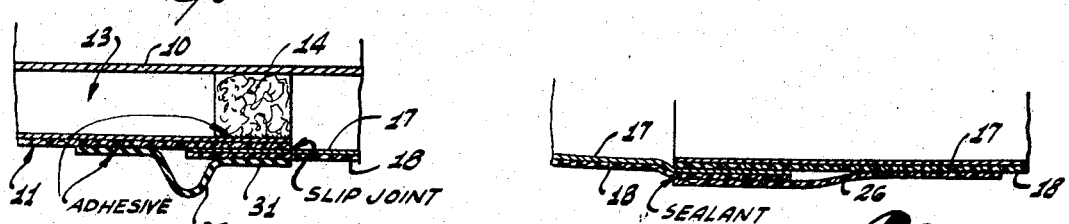
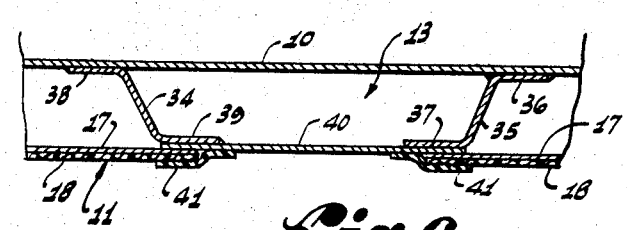
INVENTORS
JOHN F. PEYTON
JUAN GONZALEZ, JR.
ROBERT B. TRELEASE
ATTORNEYS

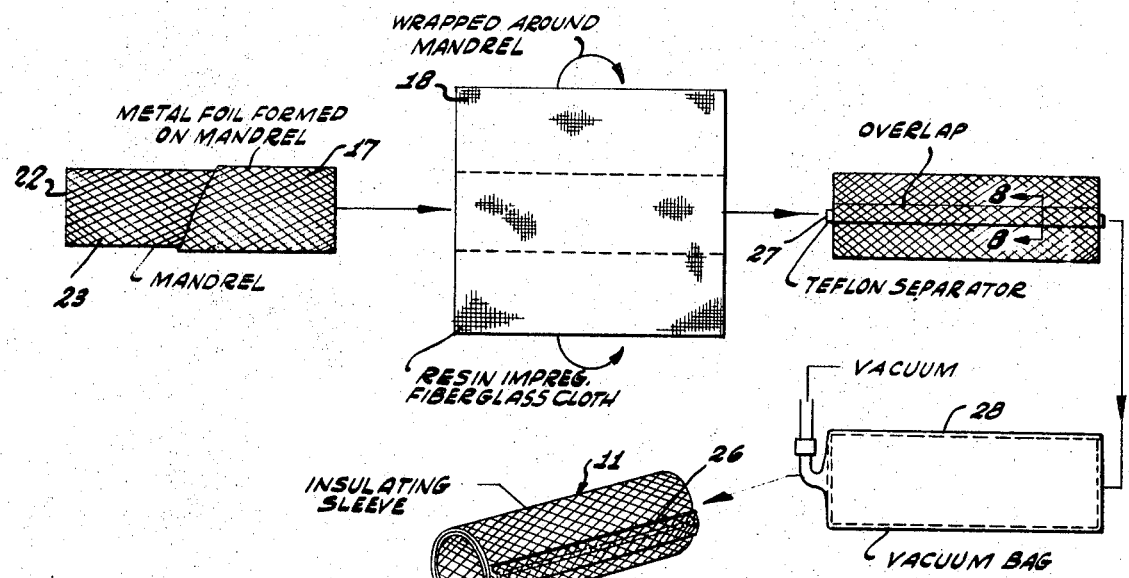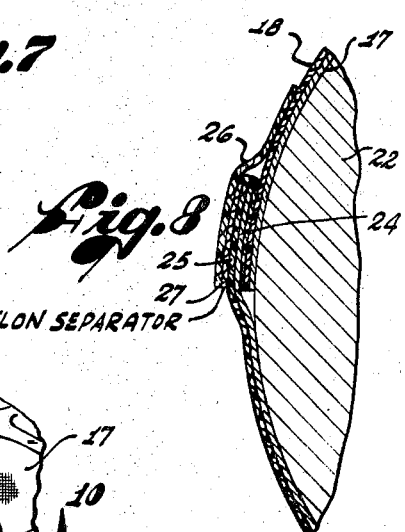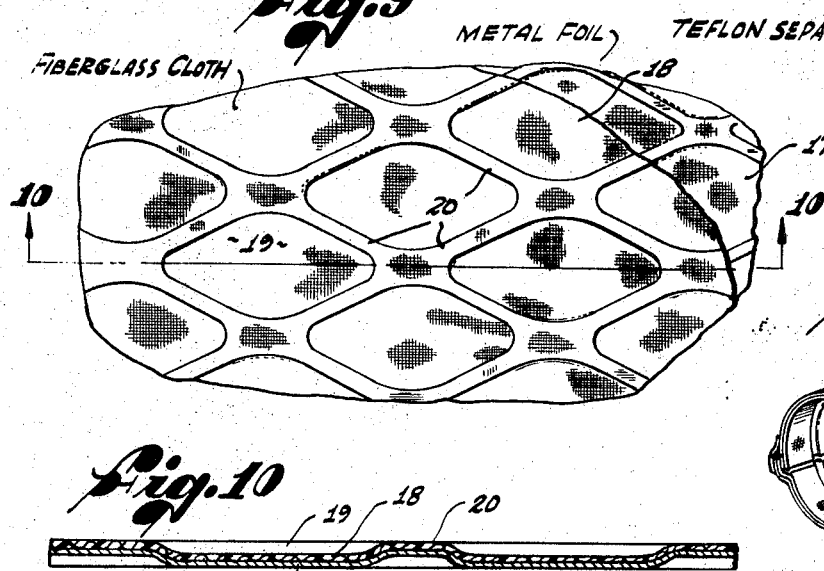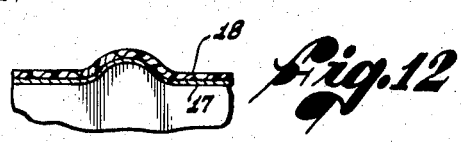

---

3,558,391
HIGH TEMPERATURE DUCT INSULATOR AND METHOD OF MAKING SAME
John F. Peyton, Long Beach, Juan Gonzalez, Jr., Garden Grove, and Robert B. Trelease, Los Angeles, Calif., assignors to Federal-Mogul Corporation, Detroit, Mich., a corporation of Michigan
Filed Apr. 13, 1967, Ser. No. 630,619
Int. Cl. B65h *19/00*
U.S. Cl. 156—171
8 Claims

ABSTRACT OF THE DISCLOSURE

This is a reflective air gap insulator for high temperature ducts in aircraft. An annular air gap is defined between the duct to be insulated and a reflective laminate insulating sleeve consisting of extremely thin aluminum foil and a lightweight resin impregnated glass cloth. Rigidizing of the thin laminate is best achieved by a pattern of impressions formed into the foil and the overlying resin impregnated fabric. Longitudinally of the duct system, spaced offset members are mounted within the annular space to maintain the insulator and duct in coaxial alignment in order to define the air gap for insulation. For straight duct sections, cylindrical insulating sleeves with one longitudinal joint are employed. For Y's, T's and other irregular sections of duct, half shell sections of insulator are employed with a pair of opposite longitudinal joints.

The insulator is laid up on a tool surface including any preferred form of rigidizing pattern, which receives first the foil and then the resin impregnated cloth. The laminate is subjected to pressure for finally forming the foil into intimate, smooth, unbroken and continuous association with the rigidizing pattern of the mandrel and of the overlying cloth onto the foil and rigidizing pattern formed on the foil. The warp and woof or other pattern of the cloth are also intimately impressed into the foil. While still so pressed, the assembly is cured at an elevated temperature. A high temperature thermosetting resin, such as phenolic, is preferred, although others may be utilized. This resin is preferably black pigmented to improve emissivity of heat.

BACKGROUND OF THE INVENTION

This invention relates to lightweight insulation for use in high temperature aircraft ducting systems and a process of making the insulator. Conventionally, these have comprised blankets of fiberglass, asbestos or mineral wool, or sometimes preformed bats of the same kinds of materials. In either case, these prior art insulators are frequently completely encased in metal foil rigidly reinforced by a rigid plastic impregnated fabric. Insulators of this type are essentially rigid thick walled structures adapted to be seated directly on the duct being insulated and to so blanket the duct. An example may be found in U.S. Pat. No. 3,187,778. Insulators of this type are almost entirely handmade and typically afford direct heat leak paths by conduction directly from the exterior of the duct being insulated to the outside of the insulated structure. In view of their reliance on the presence of batting material, their efficiency as insulators is proportional to the weight of the product involved. Accordingly, as aircraft become larger and as ducts for large aircraft increase in diameter, a severe weight penalty is involved in the use of such conventional insulators.

SUMMARY

In our present invention, we provide an extremely lightweight insulator utilizing an air gap as an insulating medium. Consequently, as reliance on a thick batting or blanket is eliminated, there is no significant weight penalty involved in the use of our insulator with an increase in diameter of the duct and insulator. The insulator shell itself is extremely light in weight as it utilizes an extremely thin metal foil reinforced by a thin ply of resin impregnated fabric. The foil reflects heat for return back to the duct being insulated and, also, serves as a fluid barrier sealing the insulated duct against fluids which might present a fire hazard upon coming into contact with a hot duct. The integral or continuous nature of the foil layer also leads to uniformity in the insulating efficiency of the insulator as hot spots in the foil are prevented.

The layer of foil is preferably aluminum, so thin and malleable as to be essentially incapable of independently sustaining a tubular form. Reinforcement is provided by a lightweight layer of fabric, preferably glass, impregnated with a high temperature thermosetting resin that is black pigmented. The foil and impregnated cloth are laid up on a tool or mandrel, preferably formed with a rigidizing contour, whereon the foil and cloth are laid up to assume the contour. Straight sections of insulator may be made with but a single longitudinally extending joint structure of an overlapping and dovetailing type. Irregular sections, such as Y's or T's, are laid up in a half shell configuration with the same type of longitudinally extending joint along one edge. The two plies are then subjected to pressure whereupon the fabric and foil come into intimate association with the rigidizing contour on the mandrel and the warp and woof or other pattern of the elements of the fabric are impressed into the malleable metal foil. Then, the assembly is subjected to an elevated temperature sufficient to cure the thermosetting resin and effect bonding together of the fabric and foil by resin in the interstices, at least, of the fabric. The cured product is essentially a resilient shell which, when closed into tubular form, is sufficiently rigid to withstand normal handling and impacts and to maintain the proper air gap spacing over relatively long spans.

The sections of insulator are held in coaxial spaced relationship to the duct being insulated to define the insulating air gap by a combination of its own rigidity and a plurality of standoff elements spaced longitudinally of the duct. Preferably, these standoffs comprise half sections or half rings of molded fiberglass adhesively secured to the aluminum or metal foil face of the insulator. The invention also provides a lightweight expansion joint construction for sealingly interconnecting adjacent ends of insulators. For supporting the insulated duct within an aircraft, an annular hanger area is provided which is also insulated by an annular air gap.

The foregoing objects, advantages, features and results of the present invention, together with others, will be evident to those skilled in the art in the light of this disclosure and may be achieved with the exemplary embodiments described in detail hereinafter.

FIG. 1 is a partial plan view of an insulated duct employing the present invention FIG. 2 is a sectional view on the line 2—2 of FIG. 1 showing a half-shell joint structure for use in irregular sections, such as Y's and T's.

FIG. 3 is a sectional view on the line 3—3 of FIG. 1 showing a joint structure for straight sections of insulator;

FIG. 4 is a sectional view, on the line 4—4 of FIG. 3, on an enlarged scale, showing an expansion joint construction;

FIG. 5 is a sectional view of a part of FIG. 3, on a greatly enlarged scale, to show details of the joint structure with greater clarity;

FIG. 6 is a sectional view of the area 6 of FIG. 1, on a larger scale, of one type of duct hanger;

FIG. 7 is a schematic diagram illustrating some of the steps in the process of manufacture of the insulator;

FIG. 7a is partial perspective view of an insulator shell bent partially open;

FIG. 8 is a sectional view, on a larger scale, illustrative of certain steps in the manufacture of the joint of the insulator;

FIG. 9 is a flat development plan view on a larger scale, of a preferred form of a rigidizing contour of the insulator;

FIG. 10 is a sectional view on the line 10—10 of FIG. 9;

FIG. 11 is a perspective view of an alternate form of rigidizing contour for the insulator; and FIG. 12 is a sectional view on the line 12—12 of FIG. 11, on a larger scale.

Referring to FIG. 1 of the drawings, there is shown an assembled duct 10 including straight sections, a T section and an elbow. Each of the duct sections is encased in a correspondingly configured section of the insulator of our invention. Thus, straight sections of the duct are enclosed within generally cylindrical insulator shells 11 while the T and elbow ducts sections are enclosed by a pair of half shell insulators 12 and 12'. The several sections of insulator are supported on the duct 10 in coaxial spaced relationship, to define an annular insulating air gap 13, by offset members spaced longitudinally of the assembly. Preferably, these offsets comprise complementary half rings 14 of molded fiberglass. Adjacent ends of insulator sections of long length are interconnected by an expansion joint means 15 in order to accommodate thermal expansion and contraction. In order to support the insulated duct within an aircraft, hanger sections 16 are incorporated in the duct and insulator assembly at longitudinally spaced points.

The insulator sections comprise a reflective laminate of very thin metal foil bonded to a synthetic resin impregnated lightweight fabric such as glass cloth. Preferably, the layer of foil 17 constitutes soft aluminum foil that is polished on one side and of a thickness on the order of 0.0007 to 0.001 of an inch. Only one ply of foil is employed which is bonded to a single ply of the fabric 18. This fabric is impregnated with a high temperature thermosetting resin, preferably phenolic, and the resin preferably contains a dull black pigment. A single layer of what is known as 128 glass cloth, so impregnated, may successfully be employed with this thin aluminum foil resulting in a composite thickness of approximately 0.007 of an inch.

The foil and fabric are laminated into such an intimate association that the warp and woof of the fabric are impressed on the thin malleable foil. This appears to greatly enhance the bond between the two plies but this extremely thin laminate will not have sufficient stiffness for most applications. Therefore, we use a rigidizing contour impressed on the foil, resin and cloth, of the type shown in FIG. 9. With this contour insulators can successfully be made with but a single ply of foil and a single ply of relatively lightweight cloth, thus avoiding the extra expense and weight penalty which would otherwise be necessary in employing a heavier ply of cloth and resin, or several plies of a light resin impregnated cloth.

The preferred form of rigidizing configuration is a pattern of generally diamond-shaped depressions 19 defined by crossing, helically extending, raised beads 20. As is shown in FIG. 10, both the foil 17 and fabric 18 are formed into this pattern and, as is shown in FIG. 9, these two plies are in such intimate association that the pattern of the warp and woof of the cloth 18 is impressed on and formed into the sheet of foil 17, their association being so intimate that the cured resin in the interstices, at least, of the fabric is not only bonded to the foil but is also, in effect, mechanically key-locked into the warp and woof of the foil. This result is best accomplished by means of the process schematically shown in FIG. 7.

In making an insulator section (in this case a cylindrical section) with the preferred form of rigidizing pattern, a mandrel 22 is first made or provided with a diamond pattern 23 complementary to the desired configuration of the finished production. This may be accomplished, for example, by attaching a tubularly arranged length of diamond mesh screen to the surface of the building tool or mandrel. Alternatively, a silicone rubber mat on which the desired pattern has been formed may be mounted on the tool, or an epoxy lay up tool may be prepared from a master that uses this wax mat with the proper impression formed therein.

A rectangular sheet of aluminum foil 17 is wrapped around the pattern 23 on the mandrel. This sheet of foil is of a width somewhat longer than the average circumferential trace of the patterned surface 23 of the mandrel so that when the foil is molded into intimate contact with the diamond shaped depressions 19 and upstanding beads 20, a longitudinally extending strip 24 remains along one edge of the foil in over-lapping relationship to the other edge. As will be apparent, the rectangular piece of foil 17 is of sufficient length so that when it has been molded to the depressions and beads of the mandrel surface 23, it will be at least as long as the desired length of insulator and the excess, if any, at opposite ends of the mandrel can be trimmed off. The foil 17 is laid on the mandrel 22 manually and pressed or manipulated with a roller for a smooth conformation of the foil to the mandrel pattern 23, thus evacuating as much air as possible from between the foil and mandrel. For straight sections, the foil and fiberglass can be pre-laminated and then formed on the tool as a single piece.

Next, a rectangular piece of the resin impregnated fiberglass cloth 18 is congruently wrapped around the foil 17 on the mandrel. The same considerations with respect to length and width of the cloth are applicable as have been mentioned with respect to the size of the foil 17. Accordingly, after the cloth 18 has been pressed or rolled into conformation with the depressions and beads already formed into the foil 17, most of the air will be evacuated from between the foil and the cloth. The latter will be left with an edge 25, overlying the longitudinal edge strip 24 of the foil.

When the cylindrical insulator is completed, the strips 24 and 25 will overlap the other edge of the insulator to be received under a strip 26 of the resin impregnated cloth which will have had one edge bonded to the exterior of the cloth 17 by the curing process. Accordingly, an elongated Teflon separator 27, of a length at least as great as the length of the section of insulator and having a cross section of elongated U-shaped configuration, receives the area of the longitudinal strips 24 and 25 therein, after which the separator 27 is in turn inserted into the gap 28 under the joint strip 26.

The mandrel 22, with the foil 17, resin impregnated cloth 18, joint strip 26, and separator 27 all mounted thereon, is next inserted into a vacuum bag 28 which is then closed and connected to a vacuum pump. The bag 28 is made of materials such as silicone or butyl rubber, or nylon plastic, of a normal diameter such as to freely receive the mandrel therein and to then be shrunk into intimate association with the rigidizing contour of the fabric 18, foil 17 and mandrel surface 23 as air is evacuated from the bag. As a result, the foil 17 is tightly molded into conformation with the mandrel pattern 23 and the resin impregnated fabric 18 is so tightly molded into conformation with the thus formed foil 17 that the warp and woof of the fabric are impressed into the malleable foil, after which the bag 28 is completely sealed. The evacuated bag and its contents are then exposed to an appropriate elevated temperature for a sufficient length of time to effect curing of the thermosetting resin.

After curing, the finished insulating sleeve 11 is somewhat resilient so that the edges of the longitudinal joint may be grasped to slightly open the sleeve whereby to draw the depressions 19 out of the mandrel pattern 23 to effect a clearance in order to slide the completed part off the mandrel 22. The separator 27 may then be removed leaving the gap 28 for the reception of the overlapping and bonded together plies 24 and 25 under the strip 26. Opposed pairs of the half ring offsets 14 may then be adhesively secured within the part onto the foil layer 24 to provide offsets spaced longitudinally of the part for mounting it on a straight section of the duct 10. The offsets 14 are mounted on opposite sides of a diametrical plane including the joint of the insulator section or shell. Thus, when the shell is bent open, as in FIG. 7a, in order to pass laterally over the straight section of duct on which it is to be mounted, the shell bends primarily along a longitudinal hinge line diametrically opposite to the joint opening without unduly bending the molded material of the offsets 14. It should be noted, however, that the offsets can, alternatively, be flexible strips of fiberglass or the like, or metal rings previously secured to the duct. In any event, as the insulator shell springs back to close around the duct, the overlapping sections 24, 25 are guided into the gap 28 under the joint strip 26, as indicated in FIG. 5. Thereafter, a suitable adhesive sealant is applied along the joint strip 26 to permanently seal the air gap within the insulator shell against penetration by any fluids.

In FIG. 11, there is illustrated a completed straight section of insulating sleeve 11' having an alternate form of rigidizing contour. In this case, the rigidizing takes the form of a plurality of circumferentially extending convolutions 30 spaced longitudinally of the insulator. The insulator 11' may be made in the same manner, i.e., on a mandrel formed with circumferential ridges corresponding to the convolutions 30 to receive first a layer of foil and then a congruent layer of the resin impregnated fabric 18. A joint strip 26 may also be attached, as before. Thereafter, the materials may be subjected to the vacuum bag 28 in order to induce the requisite forming of the foil 17 into tight smooth association with the mandrel surface and of the fabric 18 into tight smooth engagement with the foil 17 with sufficient pressure to impress the pattern of the warp and woof of the fabric onto the foil. As an alternative means of providing the requisite form of pressure, and instead of subjecting the materials of the unfinished assembly to vacuum, a shrink tape, for example, polyvinyl chloride tape, may be tightly helically wound about the fabric 18. Then, when the assembly is subjected to curing temperatures, the tape will shrink to provide the desired pressure for forming the foil onto the mandrel and the fabric onto the foil as these two layers are bonded together by the curing of the resin. After the cure, the shrink tape can readily be unwound to remove it from the fabric 18 in order to allow opening of the longitudinal joint of the insulator shell 11', in order to remove the completed article from the mandrel. The completed shell 11' may then be applied to a straight section of the duct 10 in the same manner as the shell 11.

Alternatively, the foil 17 and cloth 18 may be laid up on a flat tool and pressure applied thereon by clamping or, for example, by a vacuum bag. In this case, the rigidizing contour may conveniently take the form of beads extending longitudinally of the insulator shell so that the completed shell will be fluted, longitudinally. Such fluting configuration may also be incorporated into a mandrel for a straight or an irregular insulator but is more readily achieved in a flat tool. In the latter case, the cured completed shell will be flat but will readily bend or flex, elastically, into tubular form to be mounted on offsets around a duct.

Irregular parts, such as Y's or T's, or the half shell insulators 12 or 12' may be made in the same manner as straight tubular sections of insulator, with whatever particular configuration of rigidizing contour is desired. In the case of half shall insulators, the mandrel may be formed for laying up the foil 17 and cloth 18 for only one half shell on a rigidizing pattern formed in only one-half surface of the mandrel or alternatively, both sides of the mandrel may be provided with the desired rigidizing pattern so that both complementary half shells may be formed at the same time on the same mandrel. The latter procedure is possible by virtue of the joint structure employed, utilizing the joint strips 26 and a pair of separators 27 on opposite sides to receive the overlapping edge portions of the two half shell members. In either event, whether one half shell or both half shells be made on a mandrel, the assembly is later subjected to either a vacuum bag or shrink tapes for molding the foil 17 and fabric 18 tightly to one another and onto the mandrel and into the rigidizing contour.

After forming, the half shell insulators 12 and 12' also have molded fiberglass offset members 14 adhesively secured to the interior thereof onto the foil layer. Alternatively or additionally, other suitable size pads, or blocks, or strips of the fiberglass material may be used as internal spot support to maintain the desired air gap spacing between the half shell insulator and the duct on which it is mounted.

Adjacent ends of any two insulator shells may be telescopically engaged in the manner shown in FIG. 4. Even though the insulators may be all of the same nominal internal diameter, such telescopic engagement is practical without any special modification therefor in the tooling or mandrel since the composite sleeve wall is extremely thin so that normal tolerances will easily accommodate such telescopic engagement without undue distortion of the parts. When so telescoped, the two sections of insulator are firmly frictionally engaged but will allow thermal expansion and contraction. To seal the joint, a ring 31, preferably of silicone rubber, is tightly wound around the joint, the ring being axially shortened to leave a radially outstanding convolution 32 adapted for opposed relative movement of the two insulator shells being joined. The ring 31 may be an integral ring of a normal diameter less than the extrenal diameter of the insulator shell or it may be formed from a length of tape that is applied under tension. In either event, a suitable sealant adhesive is applied along both of the opposite axial edges of the ring 31 and under the ring in order to provide a fluid seal.

While the insulator shells of our invention are of sufficient rigidity and toughness to withstand normal handling incident to assembly them onto a duct and normal wear and tear once installed, they are not of sufficient strength to provide clamping areas whereby an insulated duct may be hung in an aircraft. Therefore, we have provided an essentially rigid clamping or hanger section 16 which incorporates an air gap as an insulating medium.

More specifically, referring to FIG. 6, a pair of metal offsets 34 and 35 are mounted exteriorly around the duct 10 to extend radially outwardly therefrom. The offsets 34 and 35 are mirrow images of one another, being generally S-shaped in section. Thus, the offset 35 has a radially innermost cylindrical flange 36 seated on the duct 10 and a radially outermost cylindrical flange 37, pointing axially oppositely of the flange 36. The offset 34 has similar flanges 38 and 39. The radially disposed portions of both offsets 34 and 35 may, if desired, be perforated both for purposes of lightening the structure and to increase resistivity to heat conduction radially outwardly from the duct 10. A short cylindrical clamping ring 40 is exteriorly seated on the flanges 37 and 39 of the two offsets and defines an annular air gap with the duct 10. While one of the offset members is rigidly affixed, as for example, by welding to both the duct 10 and the clamping ring 40, the other offset, in the illustrated instance the offset 34, is affixed only to the clamping ring 40. Thus, the cylindrical flange 38 is slidable on the duct 10. By this means, differential thermal expansion and contraction of the duct 10 and the parts of the hanger section 16 is accommodated.

With this arrangement, a hanger clamp, not shown, may be secured around the clamping ring 40 for rigid attachment of the insulated duct to a part of the aircraft structure. While the structure of the hanger section 16 provides direct conduction paths from the duct 10 outwardly, the development of a hot spot is mitigated by the presence of the air gap and there is, besides, a relatively large heat sink in the form of the aircraft structure to which the hanger section 16 is connected, which in combination with the air gap, will function satisfactorily to prevent any hazardous increase in temperature at this point of connection of the duct system to the aircraft.

Ends of insulator sections adjacent to the hanger section 16 are mounted thereon in the manner shown in FIG. 6. Thus, the external diameter of the clamping ring 40 is adapted to telescopically receive the ends of the adjacent insulator sections. Then, an elastomeric ring 41 or length of tape, preferably of silicon rubber, is applied with a sealant adhesive to seal the joint. Alternatively, if desired, sealing of the joint may take the form of the expansion joint seal shown in FIG. 4.

Although several exemplary embodiments of the invention have been disclosed herein for purposes of illustration, it will be understood that other embodiments of the invention are possible and that various changes, modifications and substitutions may be incorporated, all without departing from the spirit of the invention as defined by the claims.

We claim:

1. The process of making an elastically deformable, reflective laminate, duct insulator comprising:
    forming a rigid tool surface;
    laying a ply of a malleable metal foil in substantially continuously contacting and conforming superposition with the tool surface to evacuate air from between the tool surface and the foil;
    laying a ply of a pliable thermosetting resin impregnated fabric on the ply of malleable metal foil in substantially continuously contacting and conforming superposition with the previously layed ply of metal foil to evacuate air from between foil and the fabric;
    covering the area of the previously layed fabric with a pliable sheet material;
    evacuating air from between the pliable sheet material and the fabric, at least, to subject the plies of foil and fabric to opposed pressures between the tool surface and the pliable sheet material to more closely superimpose the foil and the fabric onto the tool surface;
    maintaining said opposed pressures during curing of the resin;
    removing the sheet material from the fabric, after the resin has cured;
    and elastically deforming the resulting laminate of foil and fabric to remove the laminate from the tool surface.

2. A process as in claim 1 in which:
    a rigidizing pattern of alternating raised and depressed surfaces is first formed in the rigid tool surface.

3. A process as in claim 1 in which:
    said opposed pressures are therefor applied with sufficient force to effect impressing the pattern of the fabric into the malleable foil.

4. A process as in claim 1 in which:
    said opposed pressures are applied by enclosing the tool and the two plies thereon in a vacuum chamber to collapse the pliable sheet into tight conforming engagement of the pliable sheet and the two plies onto the tool surface.

5. A process as in claim 1 in which:
    a strip of thermosetting resin impregnated fabric is placed along one edge of the ply of fabric with one edge portion of the strip in overlapping contact with the fabric and the other edge portion of the strip in overlapping spaced relation to the fabric;
    the overlapped spaced edge portion of the strip thereafter being held in said spaced relation during application of said opposed pressures and curing by a rigid member previously inserted thereunder.

6. The process of making an elastically deformable, reflective laminate, duct insulator comprising:
    forming a rigid tool surface with a rigidizing contour comprising alternating raised and depressed areas of the tool surface;
    superimposing a ply of a metal foil on the tool surface in substantially continuously conforming relation to the rigidizing contour to evacuate air from between the tool surface and the foil;
    superimposing a ply of a thermosetting resin impregnated fabric on the ply of foil in substantially continuously conforming relation to the rigidizing contour previously imparted to the foil to evacuate air from between the foil and the fabric;
    surrounding the previously assembled tool surface, ply of foil, and ply of fabric with a pliable sheet material in tightly substantially continuously contacting and conforming superposition on the rigidizing contour previously imparted to the fabric to more closely conform the foil and the fabric into the rigidizing contour of the tool surface;
    thereafter curing the resin to form a laminate of the foil and the fabric;
    removing the sheet material from surrounding relationship to the tool surface and the laminated foil and fabric, after the resin has cured;
    and elastically deforming the resulting laminate of foil and fabric to remove the laminate from interlocking relationship to the rigidizing contour of the tool surface.

7. A process as in claim 6 in which:
    said pressure is applied with sufficient force to impress the pattern of the fabric into the malleable metal foil.

8. A process as in claim 6 in which:
    the tool and the two plies superimposed thereon are placed within a vacuum bag comprising said pliable sheet material,
    the bag is evacuated of air sufficiently to collapse the wall material into tightly conforming engagement with the two plies to press the two plies into tightly conforming engagement with the rigidizing contour,
    and said evacuation of the bag is maintained during curing of the resin.

References Cited

UNITED STATES PATENTS

| | | | |
|---|---|---|---|
| 2,440,664 | 7/1945 | Irons | 156—218 |
| 2,606,855 | 8/1952 | Jenkins | 156—219 |
| 2,742,387 | 4/1956 | Giuliani | 156—222 |
| 2,792,872 | 5/1957 | Murray | 156—219X |
| 3,015,598 | 1/1962 | Jones | 156—222 |

SAMUEL W. ENGLE, Primary Examiner

U.S. Cl. X.R.

138—103; 156—215, 218, 428